US008150566B2

(12) United States Patent
Feau

(10) Patent No.: US 8,150,566 B2
(45) Date of Patent: Apr. 3, 2012

(54) SYSTEM FOR SELECTING DATA REPRESENTING AN AIR PARAMETER, PROCESS AND COMPUTER PROGRAM RELATING TO THE SAME

(75) Inventor: Julien Feau, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 992 days.

(21) Appl. No.: 12/122,260

(22) Filed: May 16, 2008

(65) Prior Publication Data

US 2008/0288130 A1   Nov. 20, 2008

(30) Foreign Application Priority Data

May 18, 2007   (FR) ...................................... 07 55136

(51) Int. Cl.
*G05D 1/06* (2006.01)
*G06F 19/00* (2011.01)
(52) U.S. Cl. ............ 701/8; 701/14; 701/29.7; 701/30.6; 701/30.7
(58) Field of Classification Search .................... None
See application file for complete search history.

(56) References Cited

U.S. PATENT DOCUMENTS

| | | | | |
|---|---|---|---|---|
| 4,785,403 A | * | 11/1988 | Kuhlberg | 701/14 |
| 5,001,638 A | * | 3/1991 | Zimmerman et al. | 701/14 |
| 5,297,052 A | | 3/1994 | McIntyre et al. | |
| 6,253,126 B1 | * | 6/2001 | Palmer | 701/14 |
| 6,389,335 B1 | * | 5/2002 | Vos | 701/4 |
| 7,188,008 B2 | * | 3/2007 | Garnaud et al. | 701/7 |
| 7,415,396 B2 | * | 8/2008 | D'Ouince et al. | 703/2 |

FOREIGN PATENT DOCUMENTS

| | | |
|---|---|---|
| EP | 0 393 730 A1 | 10/1990 |
| EP | 1 293 784 A2 | 3/2003 |
| FR | 2 850 356 A1 | 7/2004 |
| FR | 2 891 368 A1 | 3/2007 |

OTHER PUBLICATIONS

Floyd W. Hagen, et al., "Deutsche airbus flight test of Rosemount smart probe for distributed air data systems", Digital Avionics Systems Conference, 12$^{th}$ DASC., AIAA/IEEE, XP 010117081, ISBN: 0-7803-1343-7, Oct. 25, 1993, pp. 110-117.

Charles R. McClary, et al., "Fault-Tolerant Air Data Inertial Reference System development results", Position Location and Navigation Symposium, IEEE, XP 010117711, ISBN: 0-7803-1435-2, Apr. 11, 1994, pp. 31-36.

(Continued)

*Primary Examiner* — Khoi Tran
*Assistant Examiner* — Bao Long T Nguyen
(74) *Attorney, Agent, or Firm* — Oblon, Spivak, McClelland, Maier & Neustadt, L.L.P.

(57) ABSTRACT

A system for selecting a datum among a set of data representing an air parameter, this set comprising at least two engine data obtained by measurement respectively in the zone of two engines of an aircraft and at least two reference data obtained by measurement in the zone of the fuselage of the aircraft, the system comprising:

means for verifying pairwise agreement of three data of the set of data;
means for selecting a reference datum among the said three data if such agreement is verified.

A process and a computer program relating thereto are also proposed.

10 Claims, 6 Drawing Sheets

OTHER PUBLICATIONS

Melville D. W. McIntyre, et al., "The Boeing 777 Fault Tolerant Air Data Inertial Reference System A New Venture in Working Together", Digital Avionics Systems Conference, 14th DASC, IEEE, XP 010154179, ISBN: 0-7803-3050-1, Nov. 5, 1995, pp. 178-183.

A. Calia, et al., "Air Data Failure Management in a Full-Authority Fly-By-Wire Control System", Proceedings of the 2006 IEEE International Conference on Control Applications, XP 031011672, 0-7803-9796-7, FrC10.3, Oct. 4-6, 2006, pp. 3277-3281.

* cited by examiner

SYSTEM FOR SELECTING DATA REPRESENTING AN AIR PARAMETER, PROCESS AND COMPUTER PROGRAM RELATING TO THE SAME

The invention relates to a system for selecting data representing an air parameter, in particular for use of this parameter in control of an engine of an aircraft, as well as to a process and computer program relating to the same.

In modern aircraft, operating control and monitoring of engines are generally assured by a digital system, known especially by the name FADEC (from the English "Full Authority Digital Engine Control"), the main element of which is a control unit generally known as EEC (from the English "Engine Electronic Controller").

In order to determine, correctly, the control information intended for the engines (in particular the information for control of engine thrust), it is necessary to calculate parameters (such as the standard altitude Alt ISA, the mach number Mn and the difference Δ/SA between the effective temperature and the standard temperature), for which it is necessary to know the value of certain parameters of the air mass in which the aircraft is traveling (especially the standard pressure PS, the total pressure PT and the air temperature TAT—for "Total Air Temperature").

From a correspondence table it is then possible to know the parameters for control of engine thrust as a function of previously determined parameters (Alt ISA, Mn, ΔISA) and of the thrust requested by the aircraft pilot by means of a selector (such as a joystick).

Thus it is understood that knowledge of values correctly representing the air parameters is critical to achieving adequate thrust control.

This is why it was proposed to use redundant systems for measuring air parameters and for selecting, in the calculator associated with each engine, the value to be used among the different values measured by the different redundant systems.

For example, it was proposed to equip each engine with air-parameter sensors and to compare the value obtained by these sensors with those obtained by two systems installed in the aircraft (for example, in the fuselage zone) in order to measure the same parameters: a datum measured in the fuselage zone was then selected if it was in agreement with the measurement made in the engine zone; if no datum measured in the fuselage zone was in agreement with the measurement made in the engine zone, the latter value was used.

In this type of system, since the selection logic for an engine is based on three measurements, operating safety is no longer assured from the moment that one of the systems for measuring air parameters of an engine suffers a dysfunction, and consequently the slightest problem with these systems is reason to ground the aircraft.

Consequently, it was proposed to increase the number of redundant systems used and to compare, for example by means of systems for processing measurements made in the fuselage zone, each value obtained from a measurement in an engine zone with each value obtained from different measurements in the fuselage zone. Such logic, however, is particularly complex as regards implementation and management.

In this context, the invention proposes a system for selecting a datum among a set of data representing an air parameter, this set comprising at least two engine data obtained by measurement respectively in the zone of two engines of an aircraft and at least two reference data obtained by measurement in the zone of the fuselage of the aircraft, the system comprising means for verifying pairwise agreement of three data of the set of data, and means for selecting a reference datum among the said three data if such agreement is verified.

Such a system therefore makes it possible to respond in relatively simple manner to the constraints pertaining to operating safety (especially the rule of separation of engines), even if one of the measuring systems is faulty The selection system additionally may comprise means for verifying agreement of a reference datum with another datum of the set in the event that any pairwise agreement of three data is not verified, and means for selecting a reference datum for which the said agreement with another datum is verified, in order to eliminate the cases of multiple failures.

In addition, the means for verifying the agreement of three data may comprise means for determining if a first reference datum is in agreement with a second reference datum on the one hand and with an engine datum on the other hand, and means for selecting the first reference datum when the first reference datum is in agreement with the second reference datum and the engine datum, thus making it possible to eliminate the cases in which, in particular, the other engine datum of the set is in failure (or in other words, in the example described hereinafter, the cases of failure of a fuselage datum and of an engine datum).

The means for verifying the agreement of three data additionally may comprise means for determining, when the first reference datum is not in agreement with the second reference datum on the one hand and with the engine datum on the other hand, if a third reference datum, possibly the same as the first reference datum or the second reference datum, is in agreement respectively with the two engine data, and means for selecting the third reference datum when the third reference datum is in agreement respectively with the two engine data, in order to eliminate the cases of failure of the other fuselage datum in particular within the set (or in other words, in the example described hereinafter, the cases of failure of two fuselage data).

The means for verifying the agreement of three data also may comprise means for determining, when the third reference datum is not in agreement respectively with the two engine data, if a reference datum is in agreement respectively with the two other reference data, and means for selecting the said reference datum if it is in agreement with the two other reference data, in order to eliminate failure of data obtained from the two engines.

In practice, it may be provided that certain data will be compared in a processing unit that comprises means for determining a reference datum as a function of signals measured by an associated sensor and means for comparing the determined reference datum with each of the engine data. The processing unit also may comprise means for comparing one engine datum with the other engine datum.

In a particularly practical embodiment, it also may be provided that a control unit of an engine comprises means for comparing one reference datum with another reference datum, thus making it possible to simplify the architecture of the system.

The invention also proposes an aircraft, characterized in that it comprises an engine control system and a system for selecting a datum to be used in the said control system as described hereinabove.

Analogously, the invention proposes a process for selecting one datum among a set of data representative of an air parameter, this set comprising at least two engine data obtained by measurement respectively in the zone of two engines of an aircraft, and at least two reference data obtained by measurement in the zone of the fuselage of the aircraft, the process comprising the following steps:

verification of pairwise agreement of three data of the set of data;

if this agreement is verified, selection of a reference datum among the said three data.

The optional characteristics presented hereinabove for the selection system also may be envisioned as regards this selection process.

The invention also proposes a computer program that can be loaded into a data processing system, the said program containing instructions for implementation of the process presented hereinabove when this program is loaded and executed by a data processing system.

Other characteristics and advantages of the invention will become apparent upon reading the description hereinafter, written with reference to the attached drawings, wherein.

Figure 1:
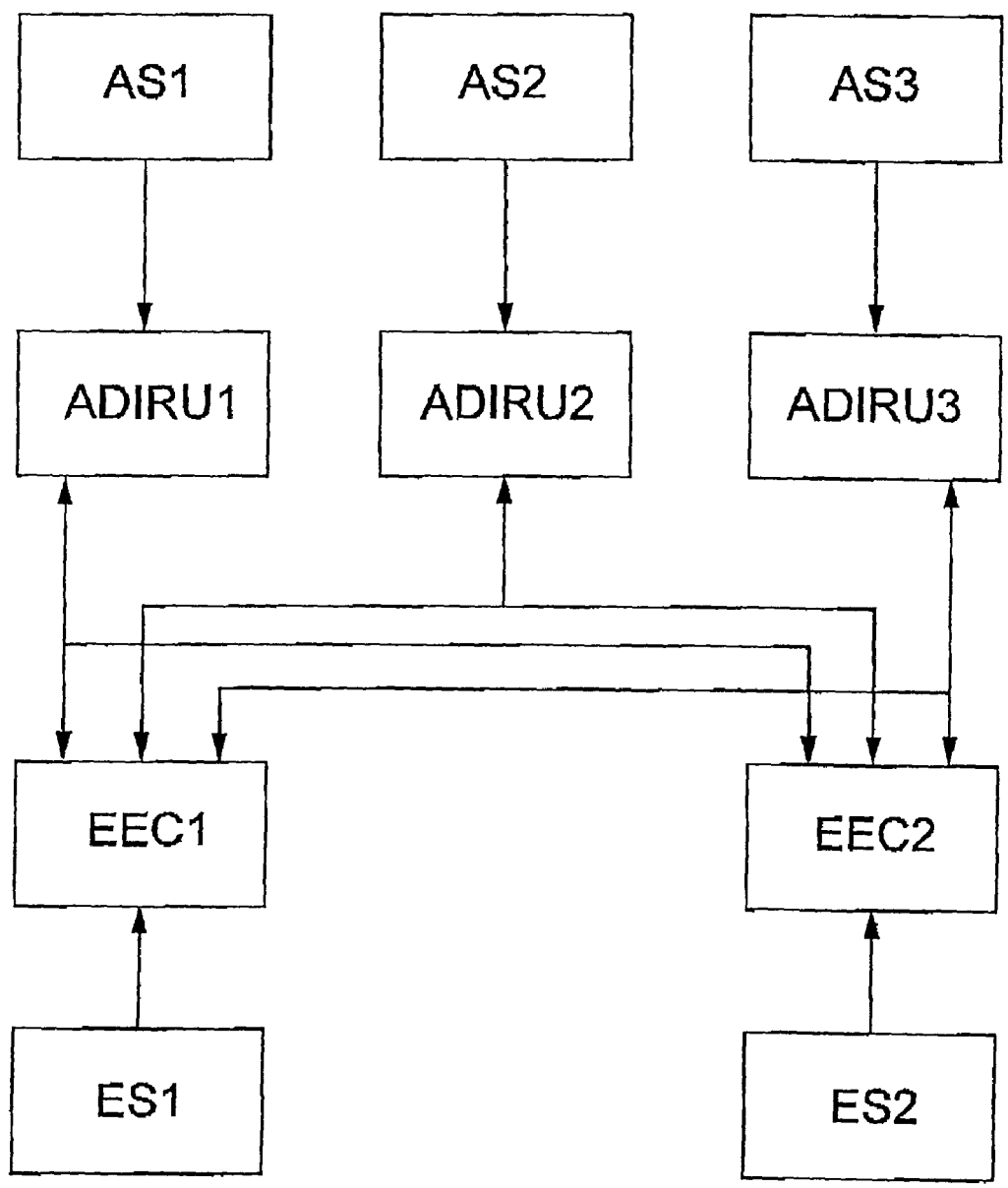
FIG. 1 represents the general architecture of a system constructed according to the teachings of the invention.

The architecture represented in FIG. 1 comprises three independent sensors AS1, AS2, AS3 situated, for example, at three different points of the surface of the fuselage of an airplane, so as to independently measure an air parameter of the air mass in which the airplane is traveling.

The parameter being measured is, for example, the static pressure (PS). Alternatively, the total pressure (PT) or the temperature (TAT) could be measured. In practice, the system for measuring and selecting parameters as described hereinafter manages the three already cited parameters, but the rest of the description is concerned in particular with a single parameter, in order to simplify the explanation.

Each sensor AS1, AS2, AS3 situated in the fuselage zone generates a signal representative of the parameter that it is measuring, intended for an associated processing unit ADIRU1, ADIRU2, ADIRU3, each of which receives the signal of the sensor associated therewith and converts it to a datum representative of the value of the parameter measured by that sensor.

Each processing unit ADIRU1, ADIRU2, ADIRU3 is constructed in the form, for example, of a processing unit for air data and inertial references, thus inspiring the acronym ADIRU (for "Air Data and Inertial Reference Unit").

The architecture of FIG. 1 also comprises two sensors ES1, ES2, each of which is capable of measuring the same parameter as that measured by the sensors AS1, AS2, AS3 and is situated respectively on the external surface of the two engines of the airplane.

The signals representative of the value of the measured parameter and delivered by each sensor ES1, ES2 situated in the engine zone are transmitted to the control unit EEC1, EEC2 of this same engine, where they are converted into data representative of the measured value.

As seen in the foregoing, each control unit EEC1, EEC2 also assures the determination of a parameter for control of an engine, on the basis in particular of measured air parameters.

The processing units ADIRU1, ADIRU2, ADIRU3 and the control units EEC1, EEC2 are connected, for example, by a bus, so as to be able to exchange and compare the data representative of the different values measured as described hereinabove.

Hereinafter the concern will be in particular the operation of the control unit EEC1 and the selection of data for the purpose of use in this control unit EEC1. The operation of the other control unit EEC2 and the selection of data to be used in this other control unit are inferred by analogy (since the operation of the two control units EEC1 and EEC2 is identical).

Figure 2:
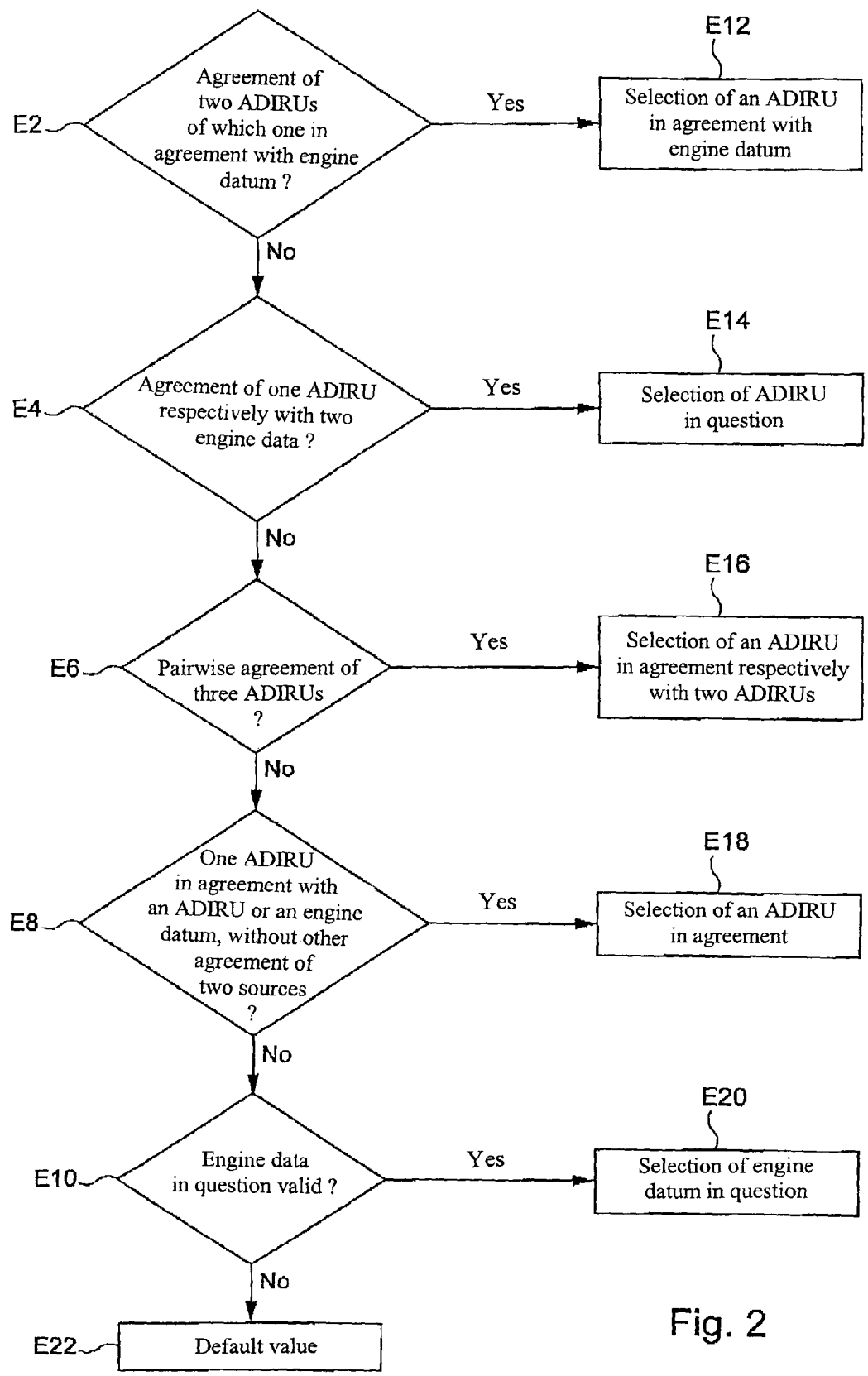
FIG. 2 represents the general selection logic for air parameters as proposed by the invention.

FIG. 2 represents an example of selection logic for the datum to be used in control unit EEC1 according to the teachings of the invention.

The selection of the data to be used is based on a series of tests detailed hereinafter, and based on certain comparisons between the different data, one embodiment of which will be given farther on, with reference to FIGS. 3 to 7.

The selection of the data representative of the parameter in question to be used in the control unit EEC1 consists, according to a first condition (E2), in verifying the agreement of the data issued by two distinct ADIRUs and the agreement of one of these two ADIRUs with a datum generated by one of the control units EEC1, EEC2 (engine data).

If these two agreements are verified, the datum issued by the ADIRU in agreement with the other two data is selected (E12) for use as the datum representative of the parameter in question in the control unit EEC1. If several data originating from the ADIRUs satisfy the first condition, the first ADIRU that responds to the condition is selected by convention in the order ADIRU1, ADIRU2, ADIRU3, thus permitting the two control units EEC1, EEC2 to select the same data, in view of the fact that they both follow this convention. In this way dissymmetry in the control of the two engines is avoided.

If the first condition is not satisfied, the system attempts to verify (E4) a second condition, namely whether there exists a datum originating from an ADIRU in agreement respectively with the two corresponding data deriving respectively from the control units EEC1, EEC2.

In the affirmative, this ADIRU is selected as the source of data representative of the parameter for the control unit EEC1 (E14). As in the foregoing, if several ADIRUs satisfy the criterion, the first ADIRU in the order ADIRU1, ADIRU2, ADIRU3 is selected by convention, so as to assure selection of the same datum in both engines.

If the second condition is not satisfied, the system searches (E6) for agreement of an ADIRU respectively with the two other ADIRUs, and it selects the first (E16).

As for the two preceding conditions, if several ADIRUs meet the third condition, the first of these in the order ADIRU1, ADIRU2, ADIRU3 will be selected by convention.

If the third condition is not met, the system searches (E8) for an ADIRU whose datum is in agreement either with another ADIRU or with one of the data generated in the control units EEC1, EEC2, even though two other sources are not in agreement.

This latter reservation (absence of two other sources in agreement) is used for the reason that, if there exists sources that are in agreement by pairs of sources but without agreement between the two pairs, it is not desired to decide in favor of one pair rather than the other. In this case in particular, a jump takes place to the test of step E10 described hereinafter.

If the fourth condition (E8) is verified (one ADIRU in agreement with another ADIRU or an engine datum without other agreement of two sources), the data originating from one ADIRU in agreement with the other datum is selected (E18).

On the other hand, when this fourth condition is not verified, the situation exists in which no datum emitted by an ADIRU has been able to be confirmed by an agreement with another datum, or in which a decision cannot be made between two pairs of sources having agreement in each pair only. In this case, it is verified (E10) whether the datum representative of the parameter measured in the engine zone in question (here, EEC1) is valid, or in other words, for example, whether the control unit EEC1 does not detect any failure in the measurement (for example, such as a measurement outside a specified range, or the absence of data deriving from the sensor).

In the affirmative, this engine datum is selected (E20) for use in the control unit EEC1.

In the negative, the control unit EEC1 uses a default value (E22) as the value representative of the parameter (PS in the example described here).

There now will be described a special embodiment that can be envisioned for implementation of the comparisons described hereinabove, for the purpose of selecting the data to be used to control the engine.

According to this embodiment, each processing unit or ADIRU compares the value measured by the sensor AS1, AS2 or AS3 associated therewith to each of the values measured in the zone of the engines (that the ADIRU receives from the control units EEC1, EEC2). Each ADIRU also makes a comparison among the data measured in the zone of the engines (received from the control units EEC1, EEC2).

The result of each comparison is:
either agreement between the data under consideration when they differ by at least a predefined value (such as 0.5 psi for the pressures PS and PT and 5° C. for the temperature TAT);
or the absence of agreement when the difference between the data under consideration is greater than this same predefined value.

It is also possible to define a hysteresis mechanism in order to avoid too frequent oscillation between agreement and absence of agreement. (Such a mechanism consists in providing a predefined value for passage from agreement to absence of agreement that is slightly greater than that used for passage from absence of agreement to agreement).

The processing units (or ADIRUs) ADIRU1, ADIRU2, ADIRU3 then each send a signal representative of the result of the comparison (respectively AP1, AP2, AP3) to the control units EEC1, EEC2, defined as follows:
APi=0 if the datum of the ADIRU is not in agreement with any engine datum (originating from a control unit EEC1, EEC2) and if the engine data are in disagreement;
APi=1 if the datum of the ADIRU is not in agreement with any engine datum, but agreement exists among the engine data;
AP1=2 if the datum of the ADIRU is in agreement with any one of the engine data;
APi=3 if the datum of the ADIRU is in agreement with both of the engine data.

In addition, each control unit EEC1, EEC2 receives and compares the data originating from the processing units ADIRU1, ADIRU2, ADIRU3 (according to a comparison method identical to that described hereinabove within each ADIRU).

Each control unit EEC1, EEC2 then determines the value of an indicator of state as a function of the result of these comparisons. Specifically:
the indicator AD1agAD2 is set to the value 1 (or "TRUE") if the datum originating from the processing unit ADIRU1 is in agreement with the datum originating from the processing unit ADIRU2 (and to the value 0 or "FALSE" if not);
the indicator AD2agAD3 is set to the value 1 (or "TRUE") if the datum originating from the processing unit ADIRU2 is in agreement with the datum originating from the processing unit ADIRU3 (and to the value 0 or "FALSE" if not);
the indicator AD3agAD1 is set to the value 1 (or "TRUE") if the datum originating from the processing unit ADIRU3 is in agreement with the datum originating from the processing unit ADIRU1 (and to the value 0 or "FALSE" if not);

In addition, it is possible to provide that the indicators of state are updated only if the condition (agreement or absence of agreement) lasts longer than a predetermined time (such as 1 s), in order to avoid excessively fast oscillation of these two indicators.

Figure 3:
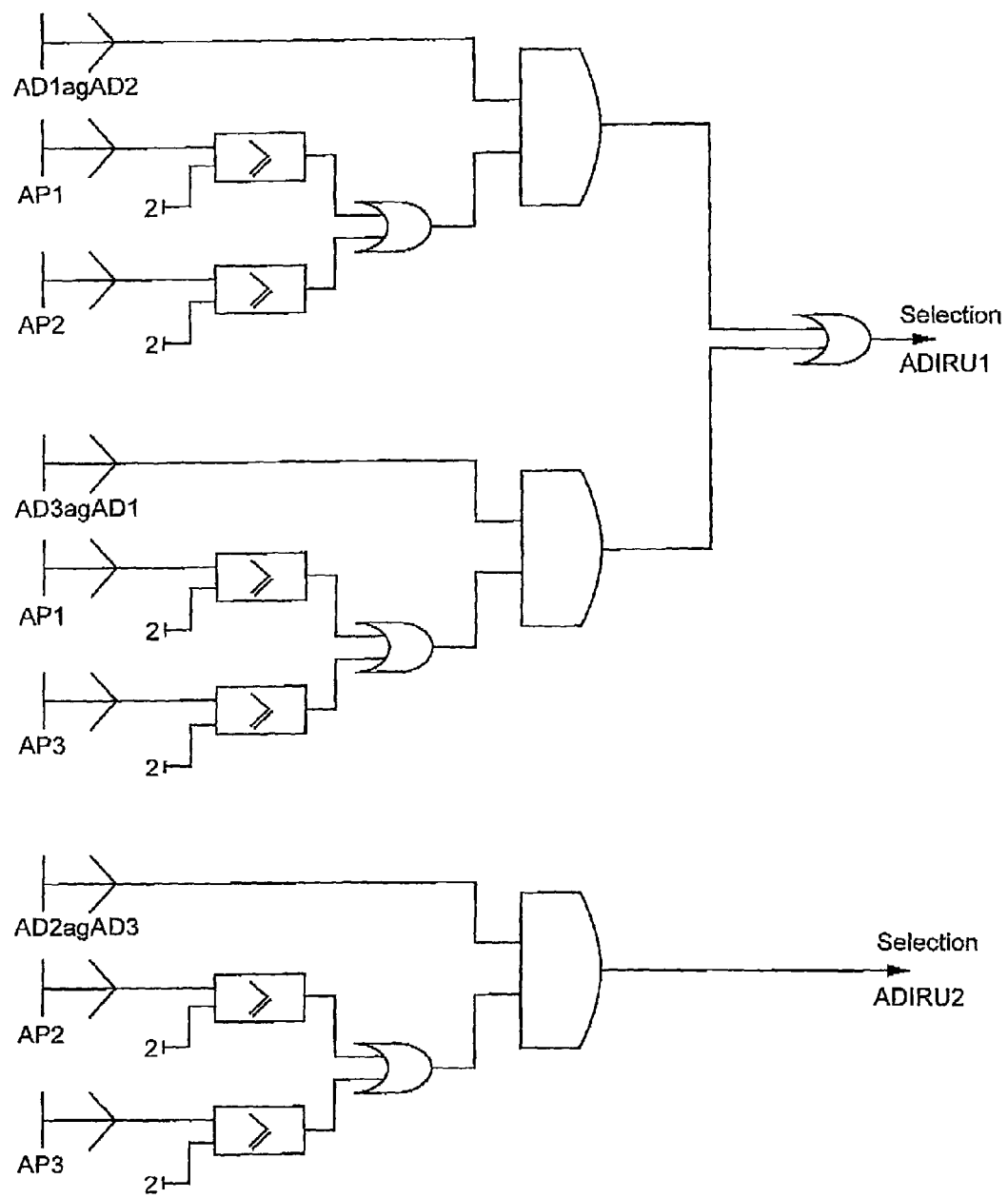
FIGS. 3 to 7 represent combinatorial logic units used in one embodiment of the invention.
Figure 4:
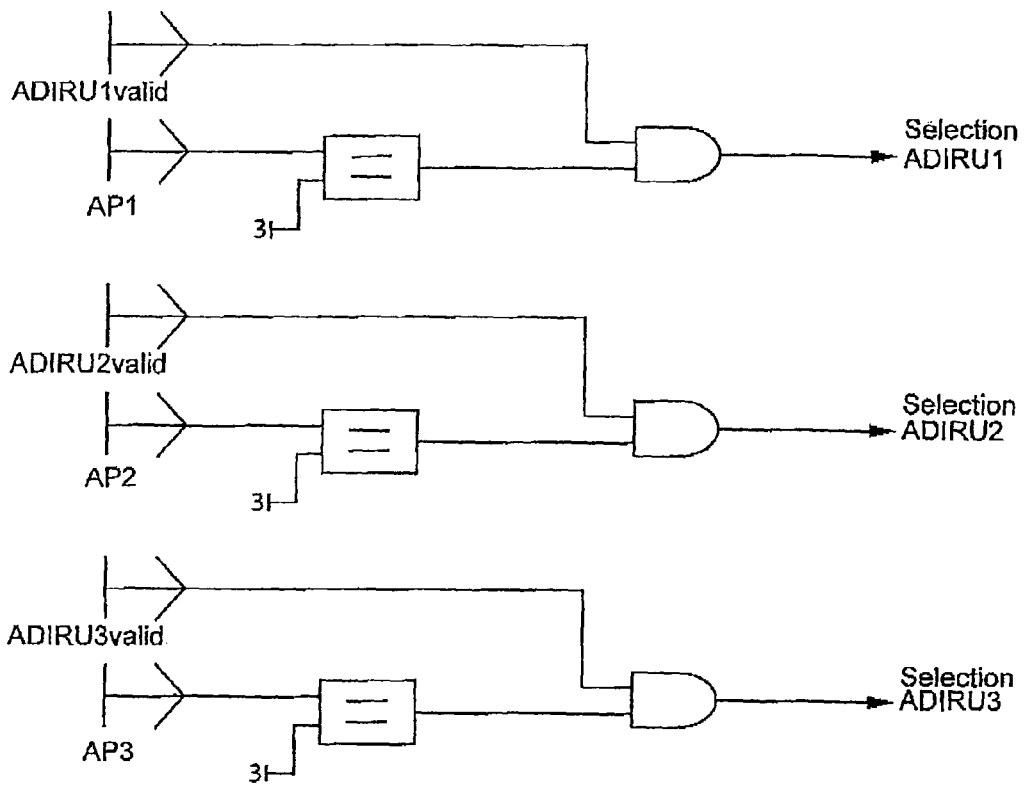
Figure 5:
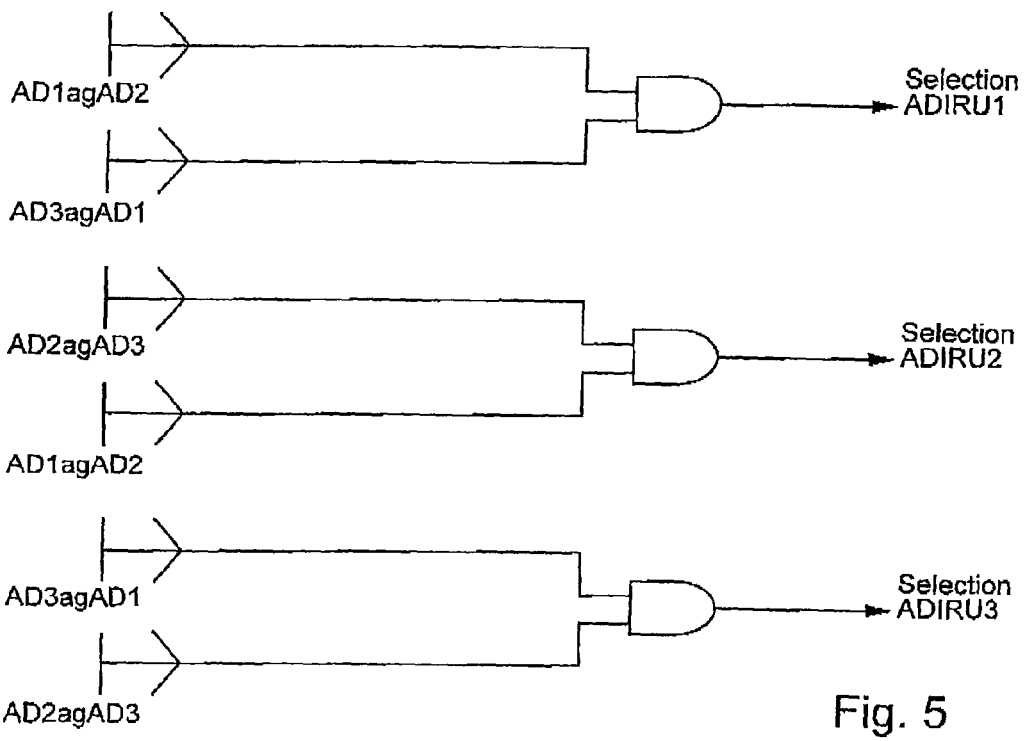
Figure 6:
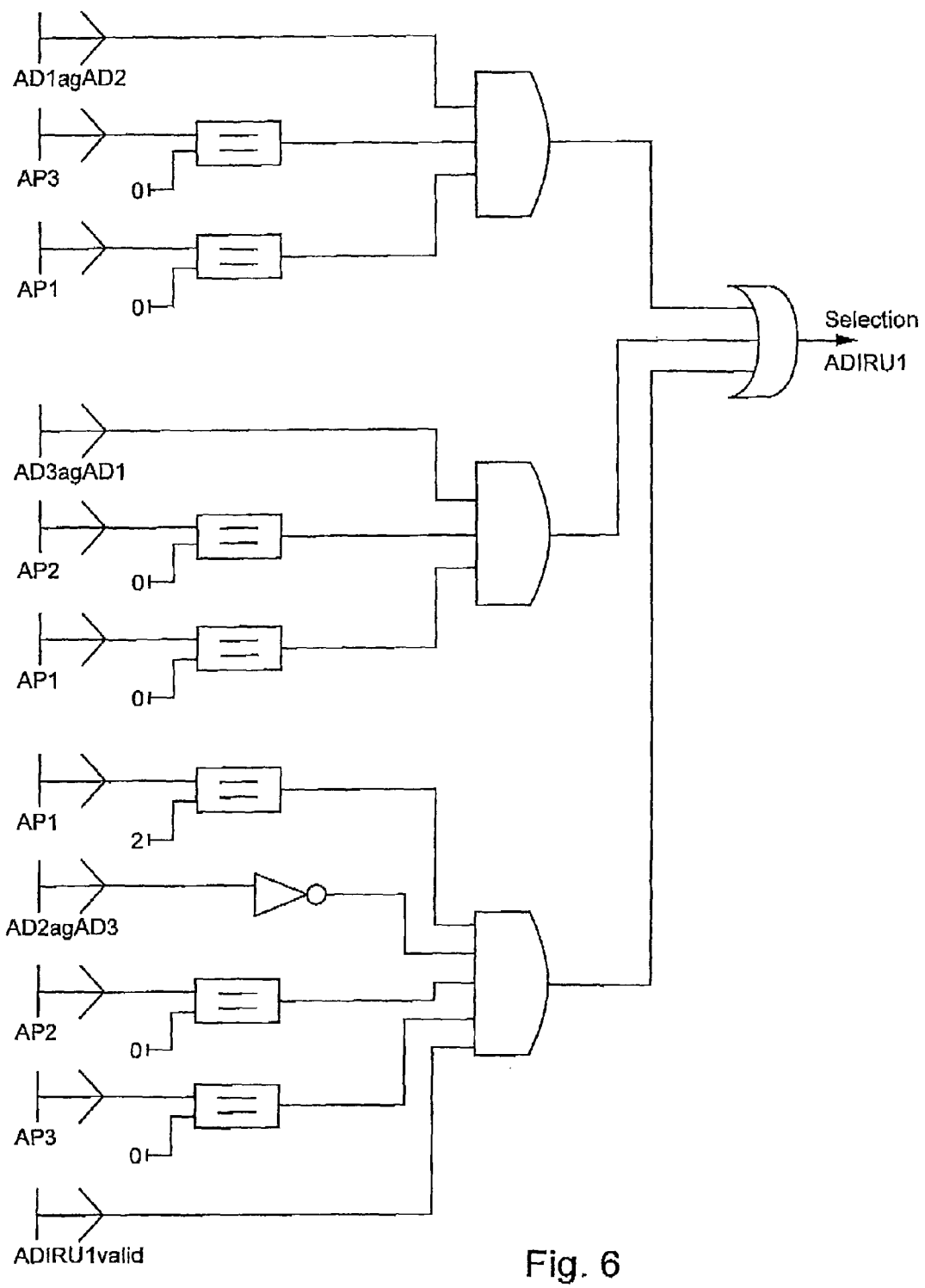
Figure 7:
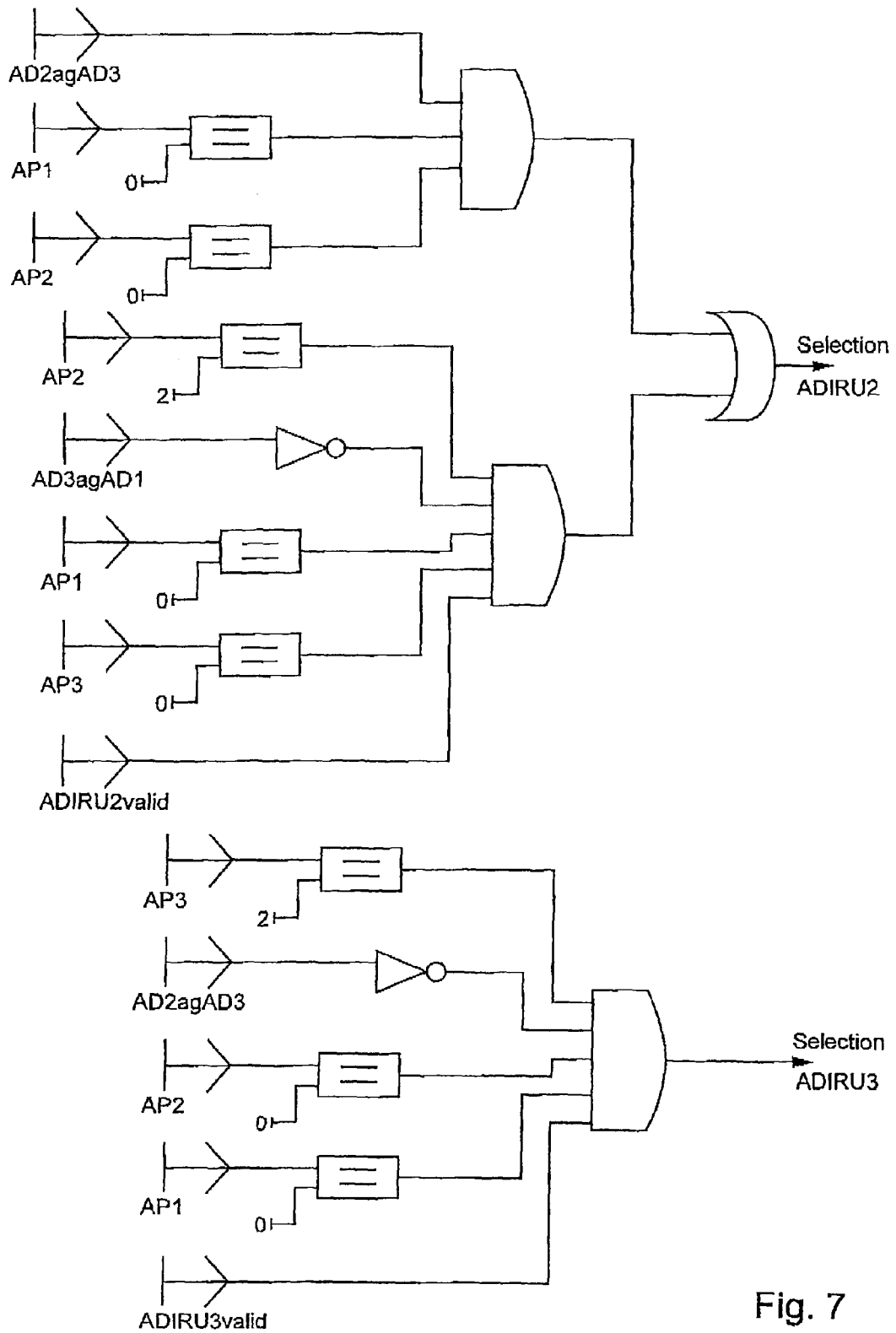

The different results of the comparison AP1, AP2, AP3, AD1agAD2, AD2agAD3, AD3agAD1 are then combined within each control unit EEC1, EEC2 by means of logic circuits, whose functions are represented in FIGS. 3 to 7, thus initiating the selection of a datum representative of the parameter, as indicated in these figures. FIGS. 3 to 5 correspond respectively to steps E2, E4 and E6 described hereinabove, while FIGS. 6 and 7 combined correspond to step E8.

The invention is not limited to the exemplary embodiments described hereinabove.

The invention claimed is:

1. A system for selecting a datum among a set of data representing an air parameter, the set of data including at least two engine data respectively obtained in two control units by measurement respectively in a zone of two engines of an aircraft and at least two reference data respectively obtained in two processing units by measurement in a zone of a fuselage of the aircraft, the system comprising:
at least one of the control units configured
to verify pairwise agreement of three data of the set of data, and
to select a reference datum among the said three data if the agreement is verified, wherein
at least one of the processing units is configured to
compare the two engine data from at least one of the control units, and
produce a signal resulting from the comparison of the two engine data and to send the resulting signal to at least one of the control units.

2. The selection system according to claim 1, wherein the at least one control unit is configured
to verify agreement of a reference datum with another datum of the set of data if no pairwise agreement of three data is verified, and
to select a reference datum for which the agreement with another datum is verified.

3. The selection system according to claim 1 or 2, wherein to verify the agreement of three data, the at least one control unit is configured
to determine if a first reference datum is in agreement with a second reference datum and if the first reference datum is in agreement with an engine datum, and
to select the first reference datum when the first reference datum is in agreement with the second reference datum and the engine datum.

4. The selection system according to claim 3, wherein to verify the agreement of three data, the at least one control unit is configured
to determine, when the first reference datum is not in agreement with the second reference datum and with the engine datum, if a third reference datum, which may be the same as the first reference datum or the second reference datum, is in agreement respectively with the two engine data, and
to select the third reference datum when the third reference datum is in agreement respectively with the two engine data.

5. The selection system according to claim 4, wherein to verify the agreement of three data, the at least one control unit is configured to determine, when the third reference datum is not in agreement respectively with the two engine data, if a reference datum is in agreement respectively with two other reference data, and to select the reference datum if it is in agreement with the two other reference data.

6. The selection system according to claim 1, wherein the at least one processing unit is configured to determine a reference datum as a function of signals measured by an associated sensor, and compare the determined reference datum with each of the engine data.

7. The selection system according to claim 1, wherein the at least one control unit is configured to compare one reference datum with another reference datum.

8. An aircraft, comprising:

an engine control system; and the system according to claim 1 for selecting a datum to be used in the engine control system.

9. A process for selecting one datum among a set of data representative of an air parameter, the set of data including at least two engine data respectively obtained in two control units by measurement respectively in a zone of two engines of an aircraft and at least two reference data respectively obtained in two processing units by measurement in a zone of a fuselage of the aircraft, the process comprising:

comparing the two engine data by at least one of the processing units;

sending a signal resulting from the comparing to at least one of the control units;

verifying pairwise agreement of three data of the set of data; and selecting, if agreement is verified, a reference datum among the three data.

10. A computer program embodied on a non-transitory medium that when executed by a data processing system, causes the data processing system to perform the process according to claim 9.

* * * * *